United States Patent
Maderer

(10) Patent No.: US 12,103,329 B2
(45) Date of Patent: Oct. 1, 2024

(54) ERASER

(71) Applicant: STAEDTLER SE, Nuremberg (DE)

(72) Inventor: Tanja Maderer, Wendelstein (DE)

(73) Assignee: STAEDTLER SE, Nuremberg (DE)

( * ) Notice: Subject to any disclaimer, the term of this patent is extended or adjusted under 35 U.S.C. 154(b) by 636 days.

(21) Appl. No.: 17/258,656

(22) PCT Filed: Jul. 8, 2019

(86) PCT No.: PCT/EP2019/025219
§ 371 (c)(1),
(2) Date: Jan. 7, 2021

(87) PCT Pub. No.: WO2020/020485
PCT Pub. Date: Jan. 30, 2020

(65) Prior Publication Data
US 2022/0348036 A1    Nov. 3, 2022

(30) Foreign Application Priority Data
Jul. 25, 2018  (DE) .................... 10 2018 005 822.1

(51) Int. Cl.
| B43L 19/00 | (2006.01) |
| C08K 3/013 | (2018.01) |
| C08K 5/00  | (2006.01) |
| C08K 5/11  | (2006.01) |
| C08K 11/00 | (2006.01) |

(52) U.S. Cl.
CPC .......... *B43L 19/0025* (2013.01); *C08K 3/013* (2018.01); *C08K 5/0016* (2013.01); *C08K 5/11* (2013.01); *C08K 11/00* (2013.01)

(58) Field of Classification Search
CPC ..... B43L 19/00; B43L 19/0025; C08K 3/013; C08K 5/0016; C08K 5/11; C08K 5/103; C08K 11/00
See application file for complete search history.

(56) References Cited

U.S. PATENT DOCUMENTS

2020/0180351 A1    6/2020   Thies

FOREIGN PATENT DOCUMENTS

| DE | 3131457 C2 | 6/1984 |
| DE | 102016008559 A1 | 1/2018 |
| KR | 20090089765 A * | 8/2009 |
| WO | 2012026861 A1 | 3/2012 |
| WO | 2016043639 A1 | 3/2016 |
| WO | WO 2017/194360 A1 * | 11/2017 |
| WO | 2018010835 A1 | 1/2018 |

OTHER PUBLICATIONS

KR 20090089765 A; Aug. 24, 2009; Yamada, Noboru.*

* cited by examiner

*Primary Examiner* — Randall E Chin
(74) *Attorney, Agent, or Firm* — LUCAS & MERCANTI, LLP; Klaus P. Stoffel

(57) ABSTRACT

An eraser for removing strokes of writing, painting and/or drawing tools, including at least one binder and at least one plasticizer. The eraser includes at least one plasticizer in the form of pentaerythritol tetravalerate.

5 Claims, 1 Drawing Sheet

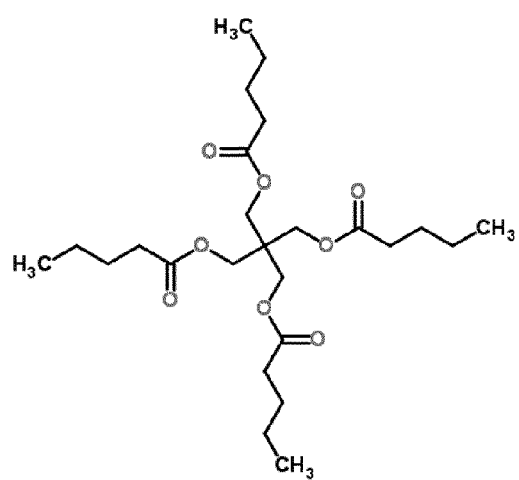

ERASER

CROSS-REFERENCE TO RELATED APPLICATIONS

The present application is a 371 of International application PCT/EP2019/025219, filed Jul. 8, 2019, which claims priority of DE 10 2018 005 822.1, filed Jul. 25, 2018, the priority of these applications is hereby claimed and these applications are incorporated herein by reference.

BACKGROUND OF THE INVENTION

The invention relates to an eraser for removing strokes from writing, painting and/or drawing tools, comprising at least one binder and at least one plasticizer.

Erasers of this type for removing strokes from writing, painting and/or drawing tools are known in principle from the prior art.

For example, soft PVC systems for erasers have been known since the 1960s. They usually consist of polyvinyl chloride (PVC) as the base polymer/binder, which is extended with filler and a plasticizer to plasticize the binder. In addition, further components such as additives, for example, colorants, solvents to achieve special erasing properties, etc. can be added. In erasers of this type, the plasticizer component has been replaced again and again over the years due to physiological requirements. PVC erasers are usually manufactured by turning the components into a paste with subsequent gelation and shaping in the extruder by the application of heat.

In general, it can be noted that the plasticizers used should be classified physiologically as nonhazardous, but should also be selected according to technical properties in order to have good extrudability, be turned into paste easily and well, have satisfactory erasure properties and have the required softness.

Acetyl tributyl citrate (ATBC) may be mentioned as an example of plasticizers classified as physiologically nonhazardous. However, when using ATBC, it turned out that the migration of such plasticizers is to be classified as too high.

DE 10 2016 008 559 A1 describes erasers having different binders and an inexpensive polyol ester as a plasticizer. It has been found to be disadvantageous here that many of the plasticizers from the group of polyol esters display a relatively high tendency to migrate.

SUMMARY OF THE INVENTION

The object of the invention is therefore to create an eraser which, on the one hand, can be manufactured inexpensively and, on the other hand, has an acceptable tendency for the plasticizer to migrate.

A further object of the present invention is to ensure technical properties, good extrudability, ability to be turned into paste easily and well, satisfactory erasing properties and required softness.

This object is achieved for an eraser for removing strokes from writing, painting and/or drawing tools, the eraser comprising at least one binder and at least one plasticizer, in that the eraser comprises at least one plasticizer in the form of pentaerythritol tetravalerate.

BRIEF DESCRIPTION OF THE DRAWING

The chemical structural formula of pentaerythritol tetravalerate (PETV) is depicted in FIG. 1.

DETAILED DESCRIPTION OF THE INVENTION

The eraser has the advantage of the migration behavior of the plasticizer remaining in an acceptable range, which is currently attributed to the branched form of the molecules of PETV (see FIG. 1), however, the eraser costs are significantly reduced due to its low price.

A suitable migration test is carried out in such a way that part of a test eraser is brought into contact with a possible reaction partner and pressed against the reaction partner. Possible reaction partners include polystyrene, polyethylene, polypropylene and pencil varnish. At the same time, a comparison sample is created in which part of a commercially available eraser having a plasticizer in the form of alkanesulfonic acid phenyl ester is also brought into contact with a similar reaction partner and pressed against the reaction partner.

The test arrangements are heated to approx. 50° C. and, after different test periods, the contact surfaces of the part of the test eraser with the reaction partner are visually examined for changes and compared with the contact surfaces of the commercially available eraser. If it appears that the change in the contact surface of the test eraser is roughly comparable to changes in the contact surface of the commercially available eraser, the test has been passed.

An eraser containing PETV as the sole plasticizer fulfills all of the above-mentioned requirements and is particularly inexpensive to manufacture.

Preferred embodiments and advantageous developments of the eraser are explained in the following.

Particularly, the eraser has a content of the at least one plasticizer in the range from 20 to 60% by weight, at least 10% by weight and at most 60% by weight of the eraser being formed by the pentaerythritol tetravalerate.

The migration behavior can be significantly reduced further by blending the PETV with at least one further plasticizer. In addition to the pentaerythritol tetravalerate, the eraser preferably comprises at least one further plasticizer in an amount of 0 to 30% by weight, with a total of 20 to 60% by weight of plasticizers in the eraser. Particularly, the eraser comprises the pentaerythritol tetravalerate in an amount of 10 to 30% by weight and the at least one further plasticizer in an amount of 10 to 30% by weight.

In a particularly preferred development of the eraser, the at least one further plasticizer is formed by at least one epoxidized vegetable oil. The use of epoxidized soybean oil (ESBO) and/or epoxidized linseed oil has proven particularly useful as an epoxidized vegetable oil. The combination of PETV with ESBO has proven to be particularly suitable for reducing migration of the plasticizer to a surface of the eraser.

The eraser also preferably comprises at least one binder from the group comprising polyvinyl chloride (PVC), polyvinyl acetate (PVAc), and polyolefins. PVC is one of the least expensive polymers available on the market.

Furthermore, the eraser preferably comprises at least one inorganic filler such as chalk (calcium carbonate), pumice powder, kaolin, glass powder, clay, talc, etc. The eraser can contain only one inorganic filler or a combination of two or more inorganic fillers.

In a preferred embodiment of the eraser, said eraser also comprises at least one additive, particularly from the group comprising colorants, waxes, oils, emulsifiers, stabilizers, solvents. The colorants can comprise inorganic pigments, such as titanium oxide, and/or organic pigments.

An eraser that is composed as follows has proven particularly useful:

| | |
|---|---|
| Binder | 20-60% by weight, |
| Fillers | 0-60% by weight, |
| Additives | 0-10% by weight, |
| Plasticizer | 20-60% by weight, | at least 10% by weight and at most 60% by weight of the eraser being formed by the plasticizer pentaerythritol tetravalerate, 0 to 30% by weight of the eraser being formed by at least one epoxidized vegetable oil, and the total being 100% by weight.

The eraser preferably comprises pentaerythritol tetravalerate in an amount of 10 to 30% by weight and the at least one further plasticizer in the form of epoxidized vegetable oil in an amount of 10 to 30% by weight. This thus achieves a balance between low costs and excellent migration properties.

It has surprisingly been found that the task is achieved with significantly good results with the use of pentaerythritol tetravalerate (PETV, CAS. no.: 15834-04-5) as the first plasticizer component, combined particularly with epoxidized soybean oil (ESBO) as the second plasticizer component.

Epoxidized soybean oil is a high molecular weight plasticizer which significantly reduces the existing migration tendency of the pentaerythritol tetravalerate.

In addition, it has been surprisingly found that the eraser properties of and thus the erasing results achieved by the erasers according to the invention are comparable to those of erasers having significantly more expensive plasticizers.

An important side effect can be seen in the fact that both the paste production and the extrusion connected thereto can be carried out in the usual way with constant quality.

In the context of the invention, the extensive removal of pencil strokes on media is understood as a measure of the erasability or ability to be erased, the residual color of the medium being a measure of the erasing performance.

Preferred compositions of the eraser according to the invention are explained in more detail with the following framework examples.

Framework Example 1

| | |
|---|---|
| Binder | 20-60% by weight |
| Pentaerythritol tetravalerate | 20-60% by weight |
| Fillers | 0-60% by weight |
| Additives | 0-10% by weight |

Framework Example 2

| | |
|---|---|
| Binder | 20-60% by weight |
| Pentaerythritol tetravalerate | 10-30% by weight |
| Epoxidized vegetable oil | 10-30% by weight |
| Fillers | 0-60% by weight |
| Additives | 0-10% by weight |

A particularly favorable plasticizer migration behavior can be achieved using at least one of the binders listed above in combination with the plasticizers pentaerythritol tetravalerate and epoxidized vegetable oil, particularly epoxidized soybean oil. The preferred binder used is PVC, since this binder achieves the best results in order to achieve the task at hand, particularly with regard to erasability and the migration behavior of the plasticizer. In addition, the manufacturing costs of the eraser can thereby be minimized.

The eraser according to the invention is to be illustrated in more detail in the following by the following formulation examples.

Formulation Example 1

| | |
|---|---|
| PVC | 30.0% by weight |
| Pentaerythritol tetravalerate | 30.0% by weight |
| Titanium dioxide | 2.0% by weight |
| Chalk | remainder |

Formulation Example 2

| | |
|---|---|
| PVC | 30.0% by weight |
| Pentaerythritol tetravalerate | 20.0% by weight |
| Epoxidized soybean oil | 10.0% by weight |
| Titanium dioxide | 2.0% by weight |
| Talc | 5.0% by weight |
| Chalk | remainder |

Formulation Example 3

| | |
|---|---|
| PVC | 25.0% by weight |
| PVAc | 5.0% by weight |
| Pentaerythritol tetravalerate | 20.0% by weight |
| Epoxidized soybean oil | 18.0% by weight |
| Carbon black | 0.5% by weight |
| Chalk | remainder |

Formulation Example 4

| | |
|---|---|
| PVC | 25.0% by weight |
| PVAc | 2.0% by weight |
| Pentaerythritol tetravalerate | 12.0% by weight |
| Epoxidized soybean oil | 9.0% by weight |
| Epoxidized linseed oil | 8.0% by weight |
| Titanium dioxide | 0.5% by weight |
| Chalk | remainder |

Such an eraser can be manufactured, for example, in the following manner.

Manufacturing Example

PVC powder, the plasticizer and optionally fillers and additives used are mixed in a stirrer to form a homogeneous plastisol.

The plastisol thereby obtained is gelled by means of a twin-screw extruder and shaped into an endless strand via a nozzle.

After the strand has passed through a cooling bath, the strand of eraser is cut to the desired length into individual erasers and, optionally, printed and packaged.

During the manufacture of the erasers, it has also been found that the hardness of the eraser can be easily and precisely adapted or adjusted by varying the plasticizer content and plasticizer ratio.

The invention claimed is:

1. An eraser for removing strokes from writing, painting and/or drawing tools, comprising: at least one binder; and at least one plasticizer, wherein, the at least one plasticizer includes pentaerythritol tetravalerate as a first plasticizer component and epoxidized soybean oil (ESBO) as a second plasticizer component, wherein the eraser is composed of:

| | |
|---|---|
| Binder | 20-60% by weight, |
| pentaerythritol tetravalerate | 10-30% by weight, |
| epoxidized soybean oil | 10-30% by weight, |
| Fillers | 0-60% by weight, |
| Additives | 0-10% by weight. |

2. The eraser according to claim 1, wherein the at least one binder is from the group comprising polyvinyl chloride (PVC), polyvinyl acetate (PVAc), and polyolefins.

3. The eraser according to claim 1, further comprising at least one inorganic filler.

4. The eraser according to claim 3, wherein the at least one inorganic filler is chalk (calcium carbonate), pumice powder, kaolin, glass powder, clay, or talc.

5. The eraser according to claim 1, further comprising at least one additive from the group comprising colorants, waxes, oils, emulsifiers, stabilizers, and solvents.

* * * * *